(12) United States Patent
Shieh et al.

(10) Patent No.: US 8,502,516 B2
(45) Date of Patent: Aug. 6, 2013

(54) VOLTAGE ADJUSTMENT MODULE AND POWER SUPPLY DEVICE

(75) Inventors: Chih-Hung Shieh, Taipei Hsien (TW); Sheng-Wen Cheng, Taipen Hsien (TW); Jun-Hom Lin, Taipen Hsien (TW)

(73) Assignee: Wistron Corporation, Taipei Hsien (TW)

( * ) Notice: Subject to any disclaimer, the term of this patent is extended or adjusted under 35 U.S.C. 154(b) by 343 days.

(21) Appl. No.: 12/942,207

(22) Filed: Nov. 9, 2010

(65) Prior Publication Data

US 2011/0304307 A1 Dec. 15, 2011

(30) Foreign Application Priority Data

Jun. 11, 2010 (TW) ................................ 99119106 A

(51) Int. Cl.
*G03F 1/40* (2012.01)

(52) U.S. Cl.
USPC ........................................... 323/284; 323/222

(58) Field of Classification Search
USPC ................. 323/207, 222, 223–225, 265, 271, 323/282–286, 351; 363/16–17, 41, 95, 97, 363/127, 131, 59, 163
See application file for complete search history.

(56) References Cited

U.S. PATENT DOCUMENTS

| 5,627,460 | A | * | 5/1997 | Bazinet et al. | 323/288 |
| 5,805,433 | A | * | 9/1998 | Wood | 363/16 |
| 6,229,289 | B1 | | 5/2001 | Piovaccari et al. | |
| 6,433,425 | B1 | * | 8/2002 | Sarkhel | 257/737 |
| 6,441,597 | B1 | * | 8/2002 | Lethellier | 323/282 |
| 6,583,610 | B2 | * | 6/2003 | Groom et al. | 323/288 |
| 6,911,808 | B1 | * | 6/2005 | Shimamori | 323/283 |
| 7,541,795 | B1 | | 6/2009 | Carlson et al. | |

FOREIGN PATENT DOCUMENTS

CN 101039069 A 9/2009

OTHER PUBLICATIONS

Office Action dated Apr. 3, 2013 for related Taiwanese Patent Application No. 099119106, and its English summary provided by the clients.
Office Action dated Mar. 26, 2013 for related Chinese Patent Application No. 2010102042689, and its English summary provided by the clients.

* cited by examiner

*Primary Examiner* — Rajinkant Patel
(74) *Attorney, Agent, or Firm* — Ladas & Parry LLP

(57) ABSTRACT

A voltage regulation module coupled to a power conversion module to form a closed loop. The power conversion module includes a PWM circuit and a conversion circuit. The conversion circuit includes serially coupled first and second power switches. The PWM circuit outputs a drive signal to control the first and second power switches to cause the conversion circuit to generate an output current. The voltage regulation module includes subtraction and regulation circuits. The subtraction circuit obtains a voltage related to the output current, and performs a subtraction operation on this voltage and a reference voltage to generate a second regulation voltage. The regulation circuit generates a level voltage, which is directly proportional to the output current, according to the second regulation voltage. The PWM circuit adjusts a voltage level of the drive signal according to the level voltage so that this voltage level follows the output current.

11 Claims, 8 Drawing Sheets

VOLTAGE ADJUSTMENT MODULE AND POWER SUPPLY DEVICE

CROSS-REFERENCE TO RELATED APPLICATION

This application claims priority of Taiwanese Application No. 099119106, filed on Jun. 11, 2010.

BACKGROUND OF THE INVENTION

1. Field of the Invention

The present invention relates to an adjustment module, and more particularly, to a voltage adjustment module used in a power supply device.

2. Description of the Related Art

Referring to FIG. 1, a conventional non-isolated direct current-to-direct current (DC-to-DC) converter 900 comprises a pulse width modulator (PWM) 910 and a power switch module 920. The DC-to-DC converter 900 outputs drive signals $V_{G1}$, $V_{G2}$ through the PWM 910, and respectively drives a first power switch PQ1 and a second power switch PQ2 in the power switch module 920 to turn on and off to thereby output a voltage PVout for supply to a back-end device (represented by impedance RL in FIG. 1).

However, the conventional PWM 910 is only able to receive a supply power (typically 5V or 12V), such that the drive signals $V_{G1}$, $V_{G2}$ output thereby are only able to use a voltage level equal to the supply voltage to drive the power switch module 920. For example, when the supply power is 5V, the drive signals $V_{G1}$, $V_{G2}$ drive the power switch module 920 with a voltage level of 5V. Therefore, when the DC-to-DC converter 900 is in a low current Iout output state (i.e., high impedance RL), it has a relatively high conversion efficiency. However, when the DC-to-DC converter 900 is in a high current Iout output state (i.e., low impedance RL), the internal resistances of the first power switch PQ1 and the second power switch PQ2 when turned on become high to thereby cause excessive loss during conduction and the conversion efficiency of the DC-to-DC converter 900 to reduce.

At the same time, when the supply power is 12V, the drive signals $V_{G1}$, $V_{G2}$ drive the power switch module 920 using a voltage level of 12V. As a result, when the DC-to-DC converter 900 is in a high output current Iout state, the first power switch PQ1 and the second power switch PQ2 may have relatively low internal resistances when turned on. As a result, in this state, the conversion efficiency when the supply power is 12V is higher than the conversion efficiency when the supply power is 5V. However, when the DC-to-DC converter 900 is in a low output current Iout state, the first power switch PQ1 and the second power switch PQ2 are in a state driven by a 12V voltage level, and excessive power loss results during switching thereof, such that the conversion efficiency of the DC-to-DC converter 900 is reduced. Hence, the conventional DC-to-DC converter 900 is unable to exhibit good conversion efficiency when in both high output current Iout and low output current Iout states.

SUMMARY OF THE INVENTION

Therefore, the object of the present invention is to provide a voltage adjustment module and a power supply device that exhibit good conversion efficiency when in both high and low output current states.

According to one aspect of this invention, the voltage regulation module is coupled to a power conversion module to form a closed loop, the power conversion module including a PWM circuit and a conversion circuit, the conversion circuit including a first power switch and a second power switch coupled in series, the PWM circuit outputting a drive signal to control the first power switch and the second power switch to turn on and off to cause the conversion circuit to generate an output current, the voltage regulation module comprising:

a subtraction circuit for obtaining a voltage that is related to the output current of the power conversion module, the subtraction circuit performing a subtraction operation on the voltage related to the output current and a reference voltage to generate a second regulation voltage; and a regulation circuit coupled to the subtraction circuit, the regulation circuit generating a level voltage according to the second regulation voltage, the level voltage being directly proportional to the output current, the PWM circuit adjusting a voltage level of the drive signal according to the level voltage, the voltage level of the drive signal following changes in the output current.

According to another aspect of this invention, the power supply device comprises:

a power conversion module including a conversion circuit and a PWM circuit, the conversion circuit including a first power switch and a second power switch coupled in series, the PWM circuit being coupled to the conversion circuit and outputting a drive signal to control the first power switch and the second power switch to turn on and off to cause the conversion circuit to generate an output current; and a voltage regulation module coupled to the power conversion module to form a closed loop, the voltage regulation module generating a level voltage according to the output current, the PWM circuit adjusting a voltage level of the drive signal according to the level voltage, the voltage level of the drive signal following changes in the output current.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
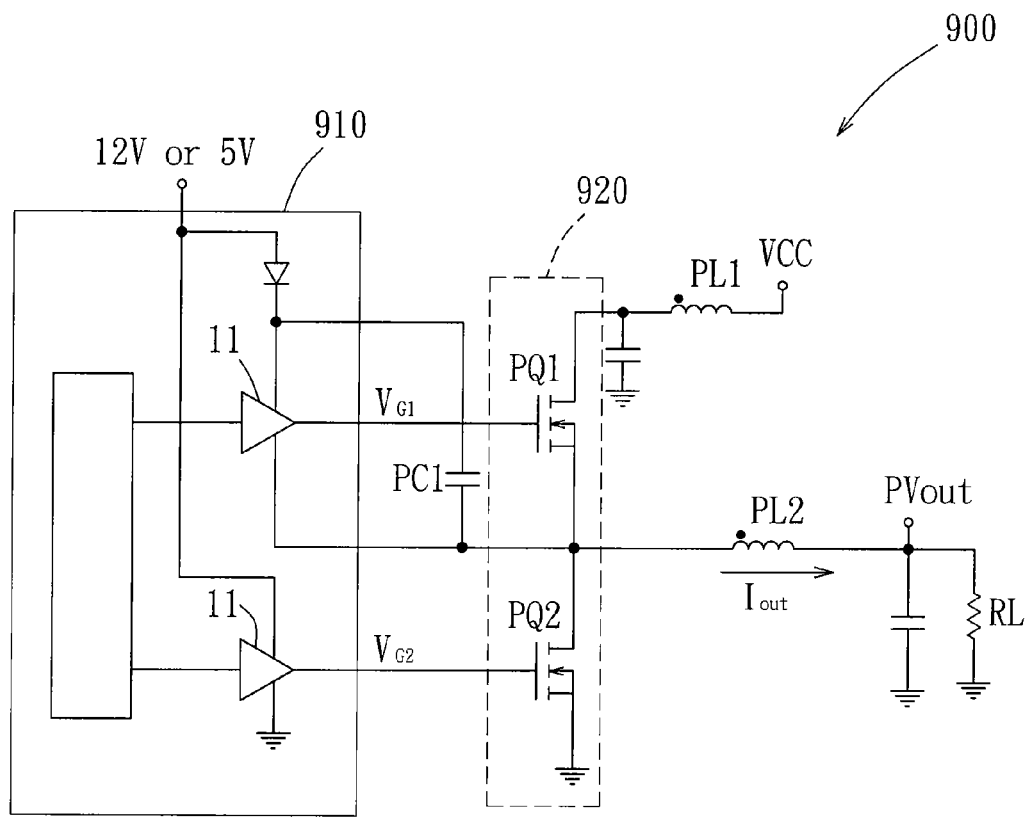
FIG. 1 is a schematic circuit diagram of a conventional non-isolated DC-to-DC converter.

Before the present invention is described in greater detail with reference to the accompanying preferred embodiments, it should be noted herein that like elements are denoted by the same reference numerals throughout the disclosure.

Figure 2:
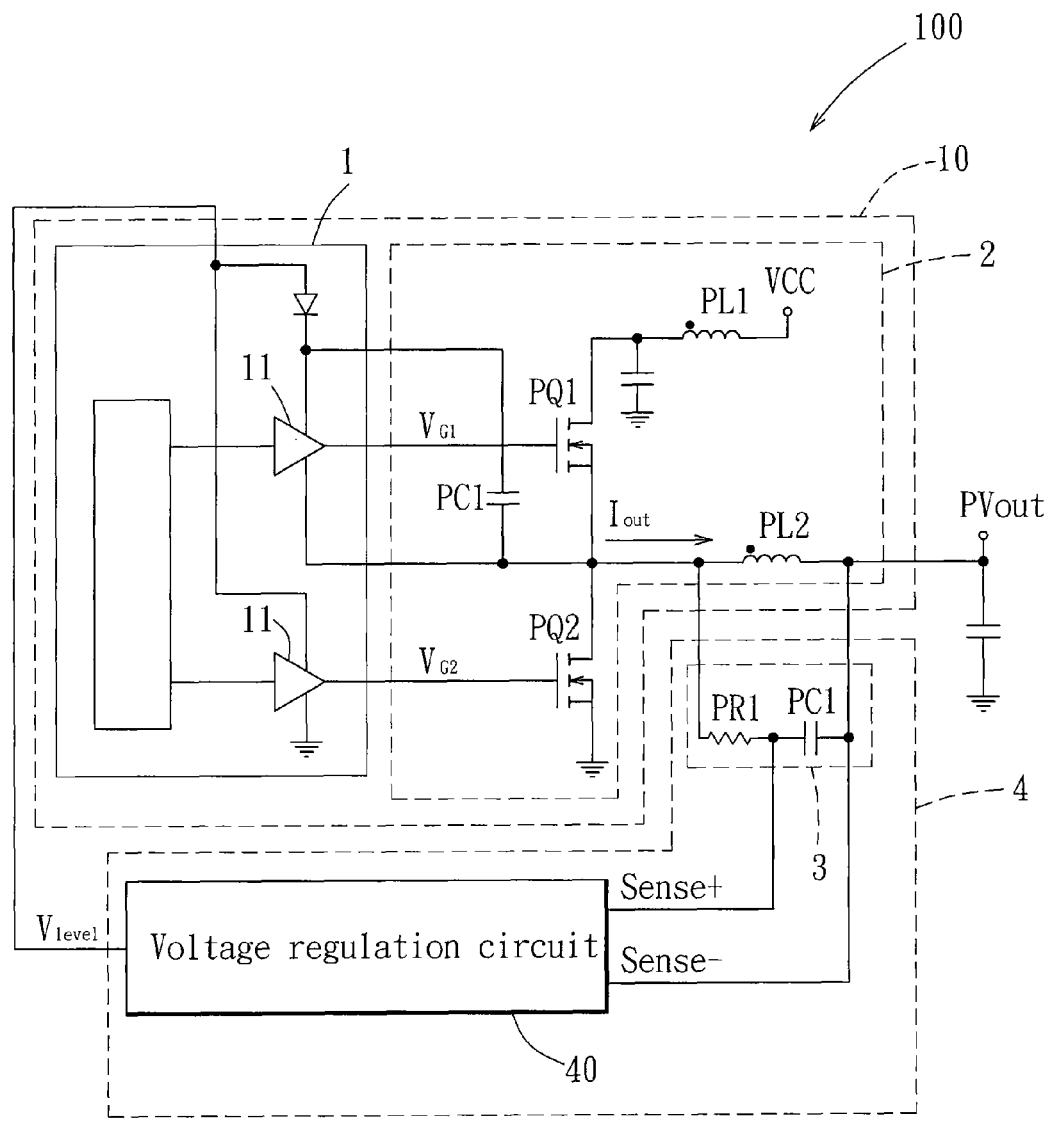
FIG. 2 is a schematic circuit diagram of a first preferred embodiment of a power supply device according to the present invention.

Referring to FIG. 2, a first preferred embodiment of a power supply device 100 according to the present invention is a non-isolated DC-to-DC converter, and is used to provide a stable DC voltage PVout to a back-end device (not shown). The power supply device 100 comprises a power conversion module 10 and a voltage regulation module 4. The power conversion module 10 includes a pulse width modulation (PWM) circuit 1 and a conversion circuit 2. The PWM circuit 1, the conversion circuit 2, and the voltage regulation module 4 are coupled to each other so as to forma closed loop. The voltage regulation module 4 controls the PWM circuit 1 in accordance with an output current Iout of the power conversion module 10, such that the PWM circuit 1 adjusts voltage levels of drive signals $V_{G1}$, $V_{G2}$ output thereby so as to drive the conversion circuit 2 to generate a stable DC voltage PVout under a condition of high conversion efficiency.

The conversion circuit 2 is coupled to the PWM circuit 1, and includes a first power switch PQ1, a second power switch PQ2, a first inductor PL1, and a second inductor PL2. The first inductor PL1, the first power switch PQ1, and the second power switch PQ2 are coupled in series. A terminal of the second inductor PL2 is coupled to a node between the first power switch PQ1 and the second power switch PQ2, and the other terminal of the second inductor PL2 outputs the DC voltage PVout. The first power switch PQ1 and the second power switch PQ2 are controlled respectively by the drive signals $V_{G1}$, $V_{G2}$ to turn on and off, such that the first inductor PL1 and the second inductor PL2 may store and discharge energy.

Figure 3:
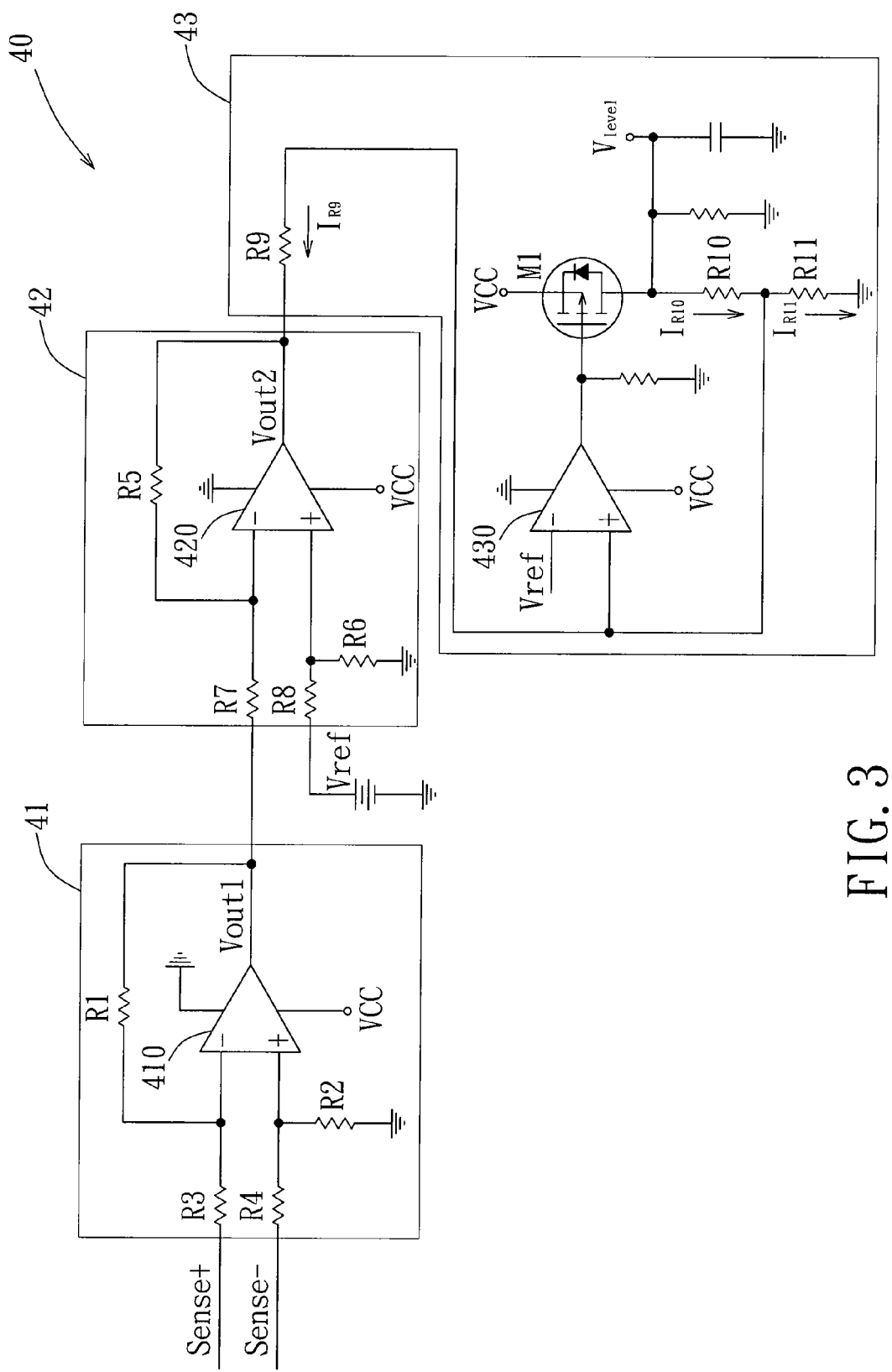
FIG. 3 is a schematic circuit diagram of a voltage adjusting unit according to the preferred embodiment.

In this embodiment, the voltage regulation module 4 includes a sampling circuit 3 and a voltage regulation unit 40. Referring to FIG. 3, the voltage regulation unit 40 includes an amplifier circuit 41, a subtraction circuit 42, and a regulation circuit 43.

The sampling circuit 3 is coupled in parallel to the second inductor PL2, and includes a first sampling resistor PR1 and a first sampling capacitor PC1 which is coupled in series with the first sampling resistor PM. A resistance value of the first sampling resistor PR1 and a capacitance value of the first sampling capacitor PC1 satisfy the following equation:

$$\frac{L}{DCR} = RC$$

where L is an inductance value of the second inductor PL2, DCR is an internal resistance of the second inductor PL2, R is a resistance value of the first sampling resistor PR1, and C is a capacitance value of the first sampling capacitor PC1. Therefore, when this equation is satisfied, the voltage across the internal resistance of the second inductor PL2 is equal to the voltage across the first sampling capacitor PC1. Also, current flowing through the second inductor PL2 and its internal resistance is the output current Iout. That is, the voltage across the first sampling capacitor PC1 is related to the output current Iout. Thus, in this embodiment, the sampling circuit 3 samples the voltage across the first sampling capacitor PC1 so as to provide sampling voltages Sence+ and Sence− to the voltage regulation unit 40 for adjustment.

Referring to FIG. 3, the amplifier circuit 41 of the voltage regulation unit 40 includes a first operational amplifier 410, a first resistor R1, a second resistor R2, a third resistor R3, and a fourth resistor R4. The first resistor R1 is coupled between an output terminal of the first operational amplifier 410 and an inverting terminal of the first operational amplifier 410, such that the amplifier circuit 41 forms a negative feedback circuit. The second resistor R2 is coupled between a non-inverting terminal of the first operational amplifier 410 and ground. One terminal of the third resistor R3 and one terminal of the fourth resistor R4 are coupled respectively to the inverting terminal and the non-inverting terminal of the first operational amplifier 410. The other terminal of the third resistor R3 and the other terminal of the fourth resistor R4 are coupled to the first sampling capacitor PC1 of the sampling circuit so as to respectively receive the sampling voltages Sence+ and Sence− for differential input to the operational amplifier 410. Therefore, after the sampling voltages Sence+ and Sence− are amplified by a predetermined ratio by the first operational amplifier 410, the output terminal of the first operational amplifier 410 outputs a first regulation voltage Vout1.

It is to be noted that in this embodiment, the ratio of the first resistor R1 to the third resistor R3 is the same as that of the second resistor R2 to the fourth resistor R4, i.e., R1/R3=R2/R4. Hence, the first regulation voltage Vout1 changes in direct proportion to the sampling voltages Sence+ and Sence−. It is further noted that the arrangement of the resistors is not limited to that described hereinabove.

The subtraction circuit 42 includes a second operational amplifier 420, a fifth resistor R5, a sixth resistor R6, a seventh resistor R7, and an eighth resistor R8. The fifth resistor R5 is coupled between an output terminal of the second operational amplifier 420 and an inverting terminal of the second operational amplifier 420, such that the subtraction circuit 42 forms a negative feedback circuit. The sixth resistor R6 is coupled between a non-inverting terminal of the second operational amplifier 420 and ground. One terminal of the seventh resistor R7 and one terminal of the eighth resistor R8 are coupled respectively to the inverting terminal and the non-inverting terminal of the second operational amplifier 420. The other terminal of the seventh resistor R7 is coupled to the output terminal of the first operational amplifier 410 to receive the first regulation voltage Vout1, and the other terminal of the eighth resistor R8 is coupled to a reference voltage Vref. Therefore, after the subtraction circuit 42 receives the reference voltage Vref and the first regulation voltage Vout1 and performs a subtraction operation thereon, the result is amplified by a predetermined ratio by the second operational amplifier 420. Subsequently, the output terminal of the second operational amplifier 420 outputs a second regulation voltage Vout2.

The regulation circuit 43 includes a third operational amplifier 430, a ninth resistor R9, a tenth resistor R10, an eleventh resistor R11, and a transfer switch M1. The ninth resistor R9 is coupled between the output terminal of the second operational amplifier 420 and a non-inverting terminal of the third operational amplifier 430, and receives the second regulation voltage Vout2. An inverting terminal of the third operational amplifier 430 is coupled to the reference voltage Vref. The transfer switch M1 is a PMOS (p-channel metal-oxide-semiconductor) transistor, and is coupled in series with the tenth resistor R10 and the eleventh resistor R11. A control terminal (gate, G) of the transfer switch M1 is coupled to an output terminal of the third operational amplifier 430, such that the transfer switch M1 is controlled by an output voltage of the third operational amplifier 430. The non-inverting terminal of the third operational amplifier 430 is coupled to a node between the tenth resistor R10 and the eleventh resistor R11. Therefore, the regulation circuit 43 changes the current $I_{R9}$ flowing through the ninth resistor R9 in accordance with the second regulation voltage Vout2, and generates a level voltage $V_{level}$ corresponding to the change in the current $I_{R9}$ at a node between the transfer switch M1 and the tenth resistor R10, i.e., at a drain terminal (D) of the transfer switch M1.

In general, when the output current Iout of the power conversion module 10 increases due to changes in impedance RL (i.e., a back-end device), the sampling voltages Sence+ and Sence− sampled by the sampling circuit 3 in accordance with the output current Iout also correspondingly increase. (??I asked about this.??) The amplifier circuit amplifies the sampling voltages Sence+ and Sence− by a predetermined ratio so as to generate the first regulation voltage Vout1. The subtraction circuit 42 generates the second regulation voltage Vout2 by amplifying the voltage difference between the reference voltage Vref and the first regulation voltage Vout1. Since the first regulation voltage Vout1 increases with increases in the sampling voltages Sence+ and Sence− (i.e., the first regulation voltage Vout1 is directly proportional to the sampling voltages Sence+ and Sence−), the second regulation voltage Vout2 correspondingly decreases (i.e., the second regulation voltage Vout2 is inversely proportional to the first regulation voltage Vout1). Also, the voltages of the non-inverting terminal and the inverting terminal of the third operational amplifier 430 of the regulation circuit 43 are identical (due to the virtual ground concept), that is, the voltages thereof are the reference voltage Vref. Therefore, when the second regulation voltage Vout2 decreases, the current $I_{R9}$ flowing through the ninth resistor R9 increases. Furthermore, the current $I_{R10}$ flowing through the tenth resistor R10 is equal to the current $I_{R9}$ flowing through the ninth resistor R9 plus the current $I_{R11}$ flowing through the eleventh resistor R11, i.e., $I_{R10}=I_{R9}+I_{R11}$. Hence, the current $I_{R10}$ increases as the current $I_{R9}$ increases, such that the level voltage $V_{level}$ correspondingly increases.

Figure 4:
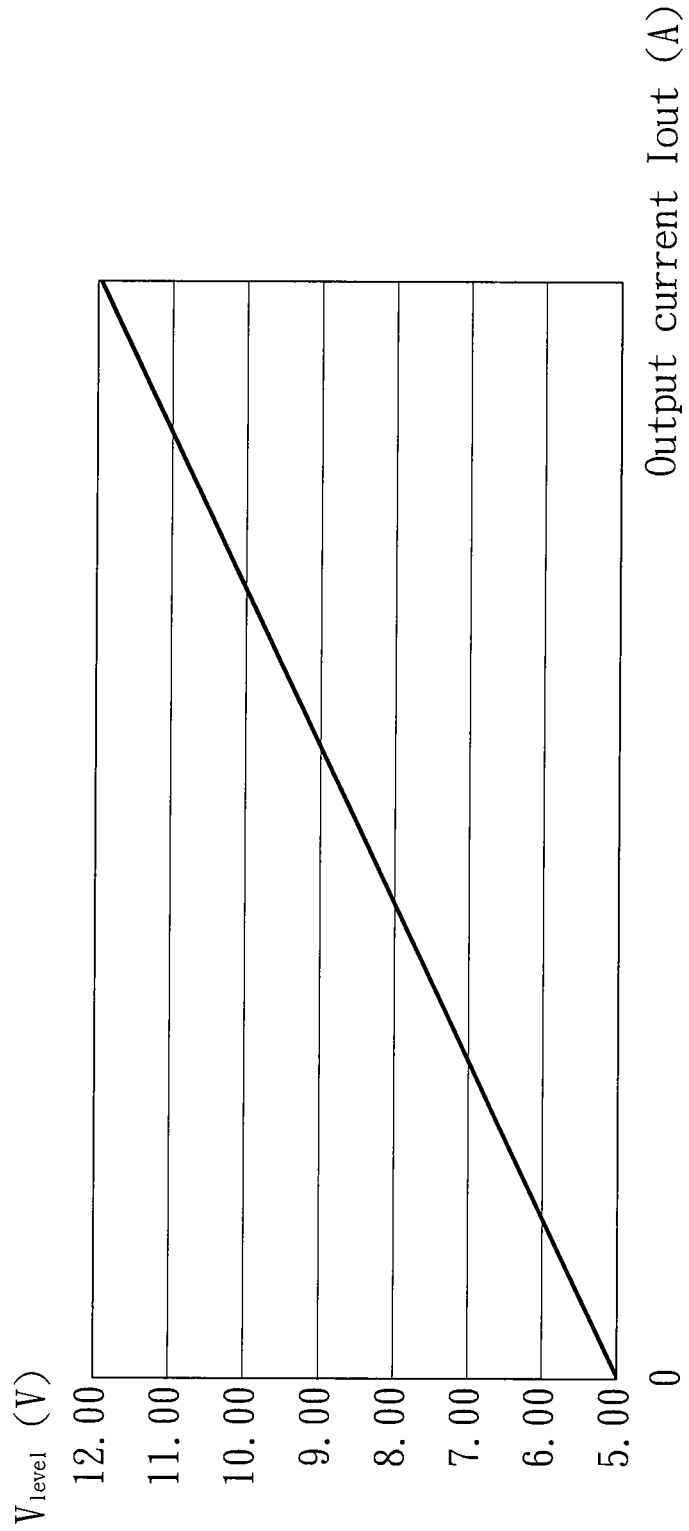
FIG. 4 is a graph illustrating the relationship between an output current of a power converting module and a level voltage.

Referring to FIG. 2, the level voltage $V_{level}$ is the supply voltage provided to two buffers 11 of the PWM circuit 1, such that the digital drive signals $V_{G1}$ and $V_{G2}$ output from the PWM circuit 1 are equal to the level voltage $V_{level}$ when at a high voltage level. Thus, referring to FIG. 4, when the output current Iout of the power conversion module 10 increases, the level voltage $V_{level}$ also increases such that the drive signals $V_{G1}$ and $V_{G2}$ are able to drive the first power switch PQ1 and the second power switch PQ2 at higher voltage levels, thereby achieving higher conversion efficiency. It is noted that the level voltage $V_{level}$ varies between 5V and 12V in this embodiment, but the level voltage $V_{level}$ is not limited in this regard and may have a different variation range as required.

Similarly, when the output current Tout from the power supply device 100 decreases (i.e., the impedance RL decreases), the sampling voltages Sence+ and Sence− sampled by the sampling circuit 3 and the first regulation voltage Vout1 generated by the amplifier circuit 41 correspondingly decrease. (Although the first operational amplifier 410 amplifies the sampling voltages Sence+ and Sence−, the ratio of amplification remains the same. Accordingly, the first regulation voltage Vout1 decreases by a proportional amount.) The subtraction circuit 42 subtracts the fixed reference voltage Vref from the first regulation voltage Vout1, and amplifies the result to obtain the second regulation voltage Vout2. The current $I_{R9}$ decreases such that the level voltage $V_{level}$ also decreases.

Therefore, the voltage regulation unit 40 varies the level voltage $V_{level}$ according to the output current Iout of the power conversion module 10, such that the drive signals $V_{G1}$ and $V_{G2}$ may vary in a manner corresponding to different back-end devices and thereby achieve optimal power conversion efficiencies. The relationship between the output current Iout and the level voltage $V_{level}$ may be expressed as follows:

$$V_{level} = V_{ref} + \frac{R10 \times R1}{R9 \times R3} V_{sense} + \frac{R10}{R11} V_{ref}$$

where Vsense is the voltage difference between the sampling voltages Sence+ and Sence−. The sampling voltages Sence+ and Sence− sampled by the sampling circuit 3 are the differential input voltage for the amplifier circuit 41 of the voltage regulation unit 40. In some embodiments, a voltage at a node between the first sampling resistor PR1 and the first sampling capacitor PC1 (the voltage is similarly related to the output current Iout) is sampled, and input directly to one input terminal of the subtraction circuit 42 of the voltage regulation unit 40, such that the subtraction circuit 42 outputs the second regulation voltage Vout2 by amplifying the voltage difference between the reference voltage Vref and this input voltage. Hence, the present invention in not limited in this regard.

Figure 5:
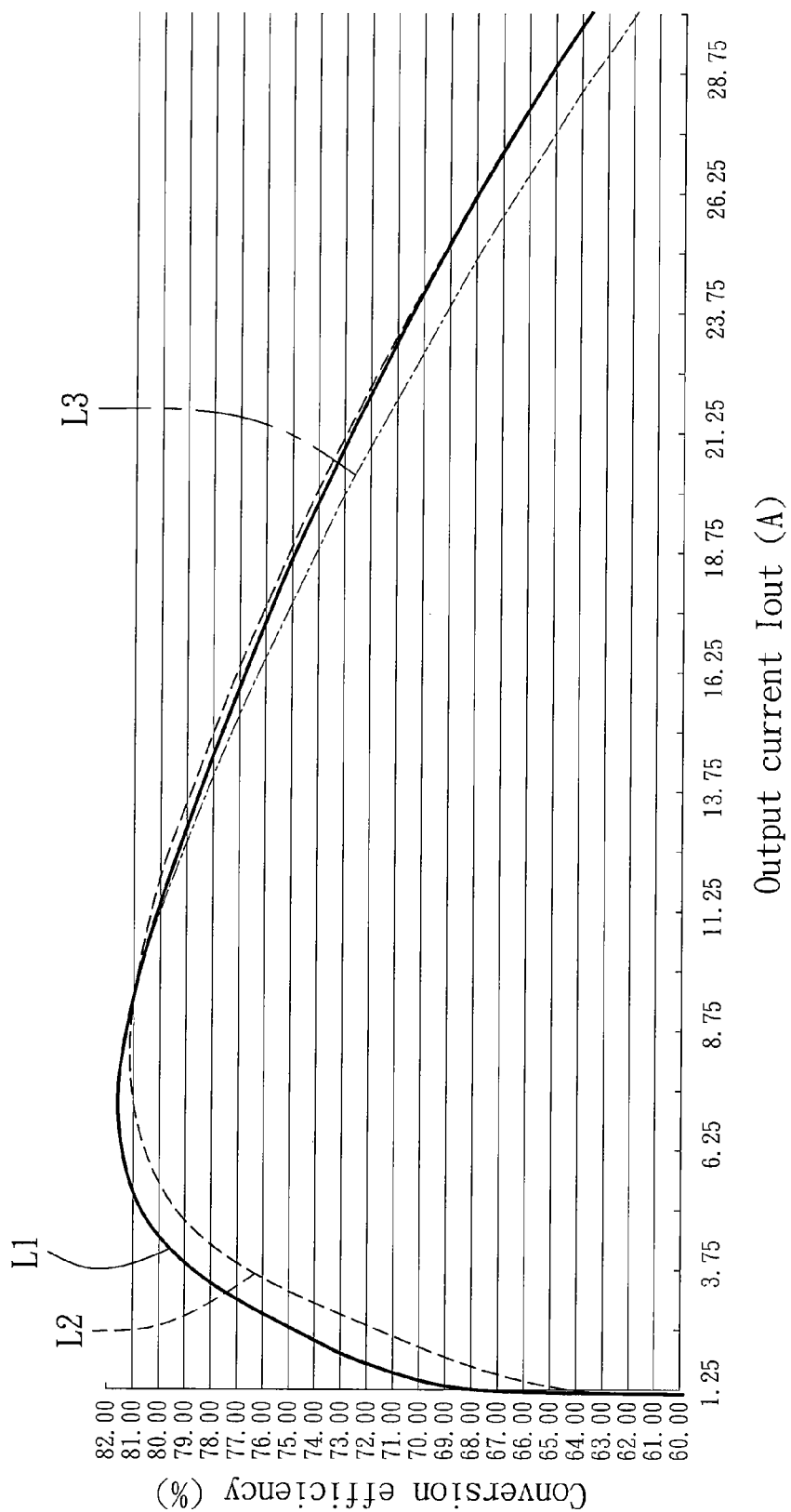
FIG. 5 is a graph illustrating the relationship between the output current of the power converting module and a conversion efficiency thereof.

FIG. 5 is a graph illustrating the relationship between the output current Iout of the power conversion module 10 and the conversion efficiency thereof. Curve L1 is the relationship curve of the power conversion module 10, curve L2 is the relationship curve of the prior art with a supply voltage of 12V, and curve L3 is the relationship curve of the prior art with a supply voltage of 5V. As is evident from FIG. 5, when the output current Iout of the power conversion module 10 is low, i.e., less than 8.75 A, the conversion efficiency is better than that of the prior art with a supply voltage of 12V. Moreover, when the output current Iout of the power conversion module 10 is high, i.e., greater than 8.75 A, the conversion efficiency is better than that of the prior art with a supply voltage of 5V. That is, through control by the voltage regulation unit 40, the power conversion module 10 exhibits a good conversion efficiency at any output current Iout.

Figure 6:
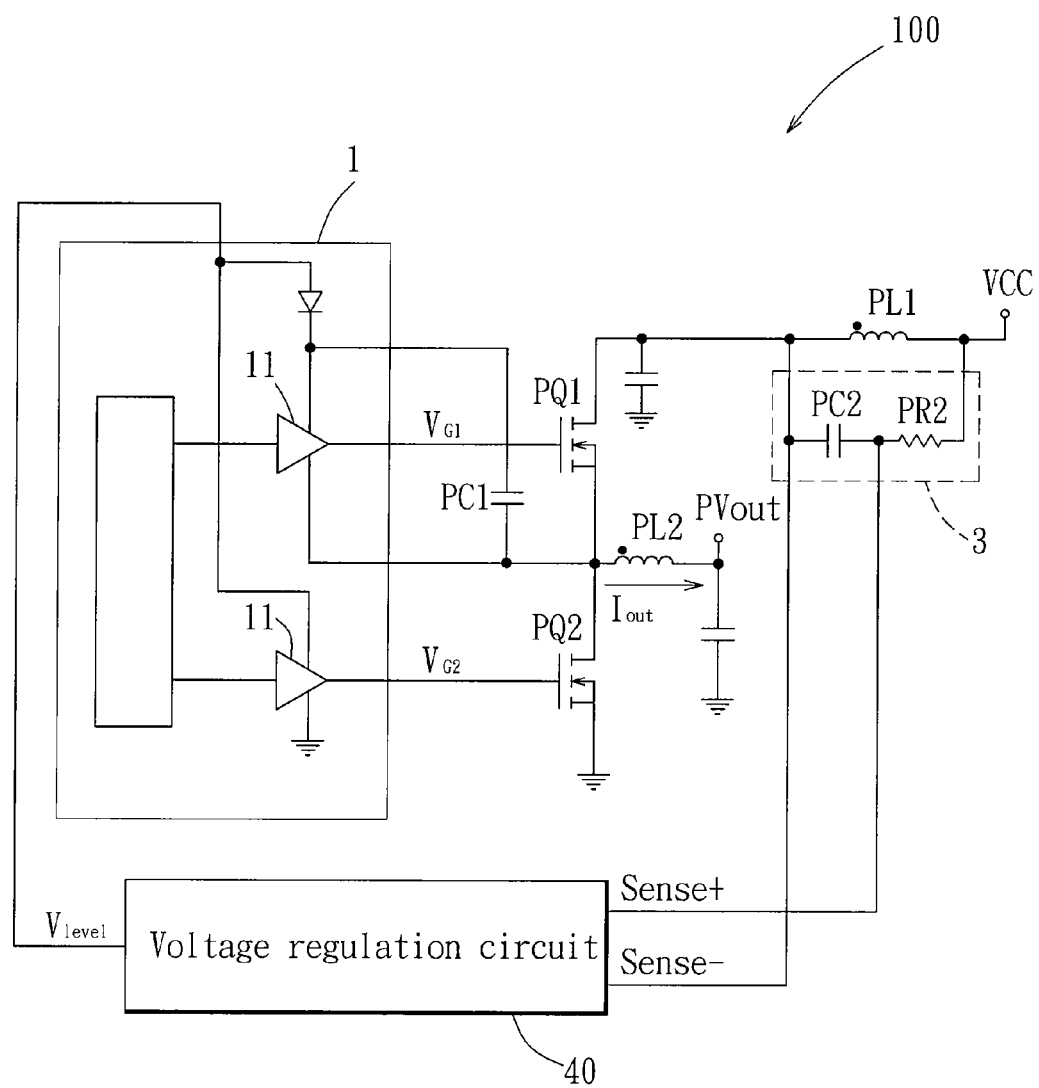
FIG. 6 is a schematic circuit diagram of a second preferred embodiment of a power supply device according to the present invention.

FIG. 6 illustrates a second preferred embodiment of the power supply device 100 according to the present invention. The second preferred embodiment is similar to the first preferred embodiment but differs therefrom in aspects that will be described below.

The sampling circuit 3 is coupled to the first inductor PL1 in parallel, and includes a second sampling resistor PR2 and a second sampling capacitor PC2 which is coupled in series with the second sampling resistor PR2. The second sampling resistor PR2 and the second sampling capacitor PC2 are designed so as to satisfy the following equation:

$$\frac{L}{DCR} = RC$$

where L is an inductance value of the first inductor PL1, DCR is an internal resistance of the first inductor PL1 (not shown), R is a resistance value of the second sampling resistor PR2, and C is a capacitance value of the second sampling capacitor PC2. Therefore, when the above equation is satisfied, the voltage of the internal resistance DCR of the first inductor PL1 is equal to the voltage across the second sampling capacitor PC2. Thus, in this embodiment, the sampling circuit 3 samples the voltage across the second sampling capacitor PC2 so as to provide the sampling voltages Sence+ and Sence− to the voltage regulation unit 40 for regulation thereby. Since the current flowing through the first inductor PL1 is related to the output current Iout, the voltage regulation unit 40 of this embodiment can similarly vary the voltage levels of the drive signals $V_{G1}$ and $V_{G2}$ output by the PWM circuit 1 in accordance with the voltage across the second sampling capacitor PC2.

Figure 7:
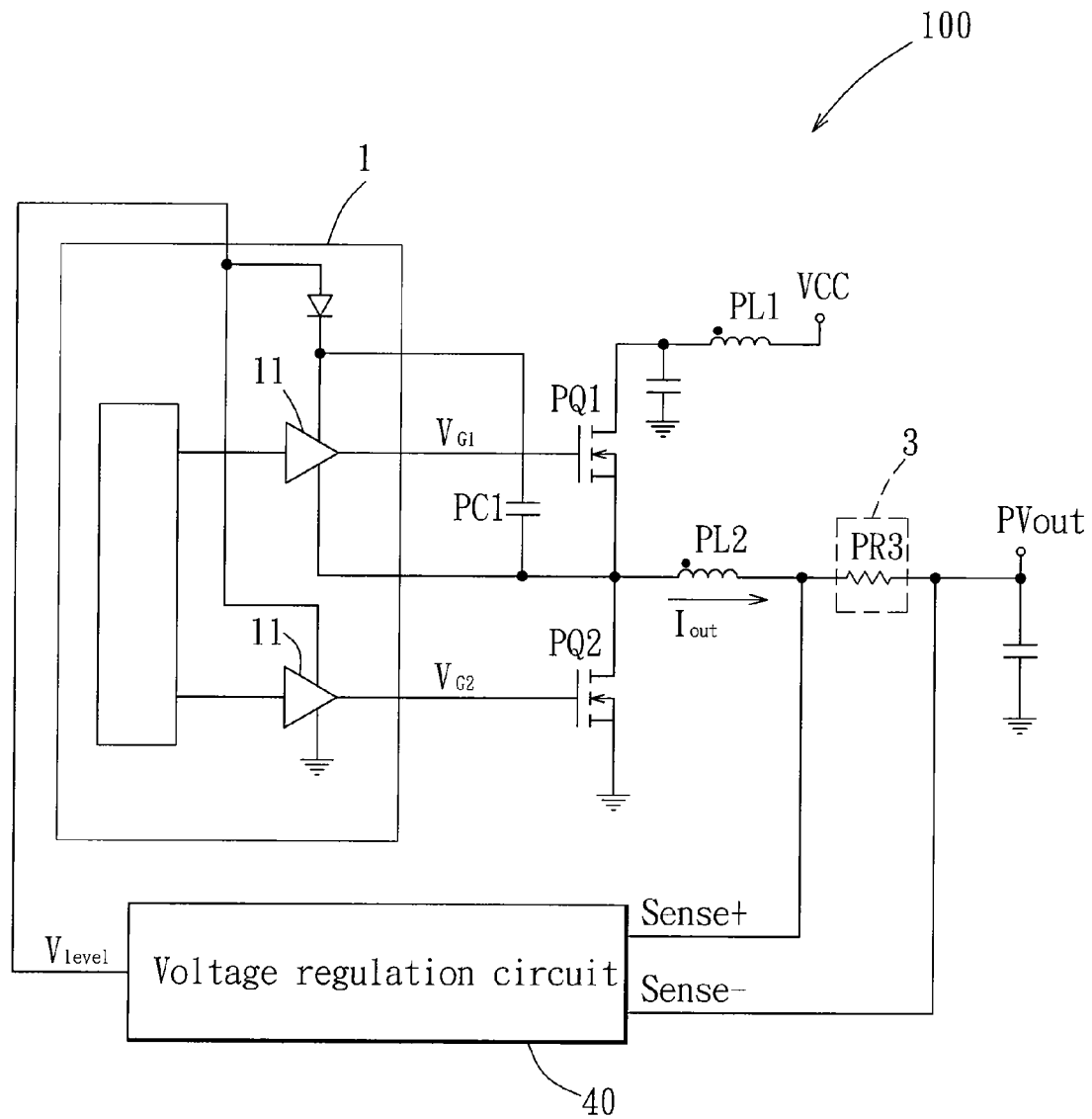
FIG. 7 is a schematic circuit diagram of a third preferred embodiment of a power supply device according to the present invention.

FIG. 7 illustrates a third preferred embodiment of the power supply device 100 according to the present invention. The third preferred embodiment is similar to the first preferred embodiment but differs therefrom in aspects that will be described below.

The sampling circuit 3 is a third sampling resistor PR3 coupled to the second inductor PL2 in series. The second inductor PL2 is coupled between (a) the node between the first power switch PQ1 and the second power switch PQ2 and (b) the third sampling resistor R3, such that the output current Iout of the power conversion module 10 flows through the third sampling resistor PR3. Thus, a voltage across the third sampling resistor PR3 may reflect changes in the output current Iout. The sampling circuit 3 samples the voltage across the third sampling resistor PR3 so as to provide the sampling voltages Sence+ and Sence− to the voltage regulation unit 40 for regulation thereby.

Figure 8:
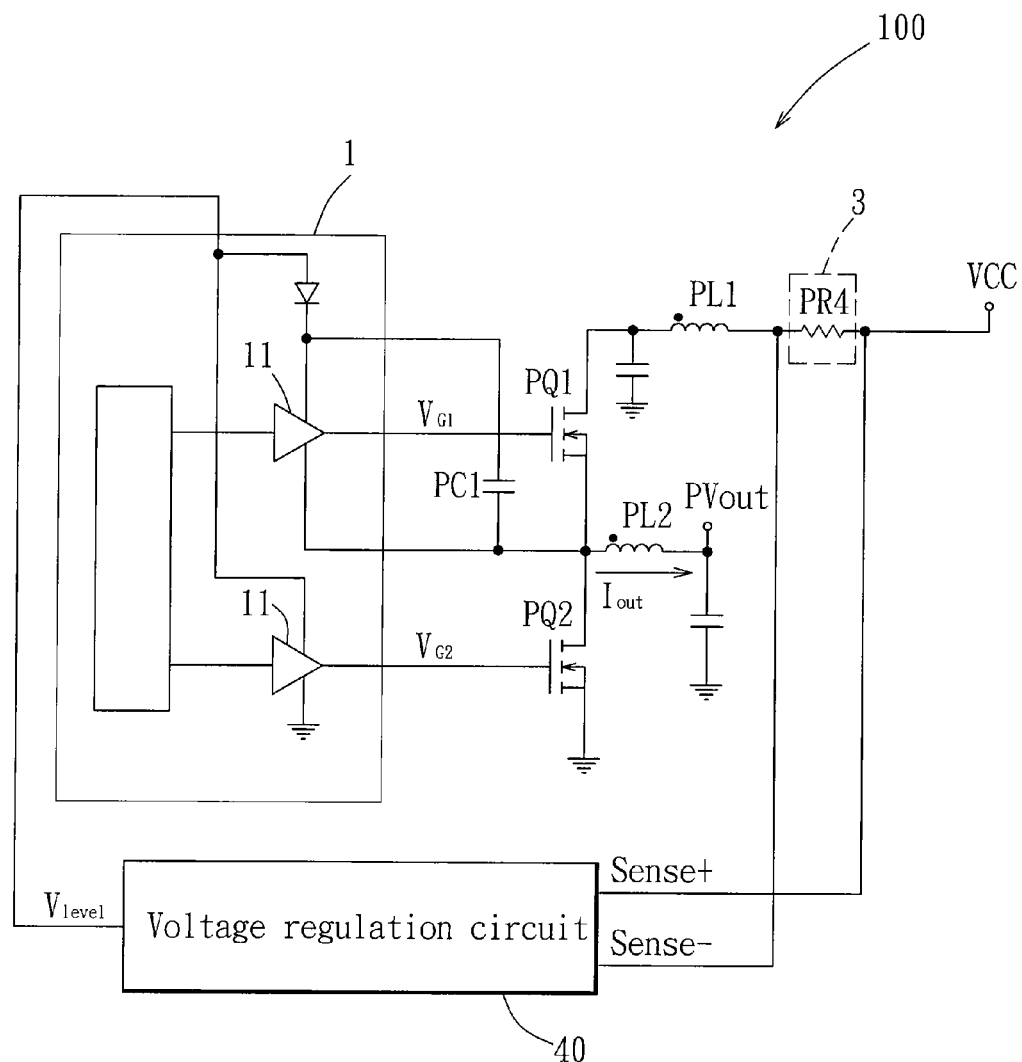
FIG. 8 is a schematic circuit diagram of a fourth preferred embodiment of a power supply device according to the present invention.

FIG. 8 illustrates a fourth preferred embodiment of the power supply device 100 according to the present invention. The fourth preferred embodiment is similar to the third preferred embodiment but differs therefrom in aspects that will be described below.

The sampling circuit 3 is a fourth sampling resistor PR4 coupled to the first inductor PL1 in series. The fourth sampling resistor PR4, the first inductor PL1, the first power switch PQ1, and the second power switch PQ2 are coupled in series. Since current flowing through the fourth sampling resistor PR4 is proportionally related to the output current Iout of the power conversion module 10, the voltage regulation unit 40 similarly can adjust the voltage levels of the drive signals $V_{G1}$ and $V_{G2}$ in accordance with the voltage across the fourth sampling resistor PR4 (i.e., the sampling voltages Sence+ and Sence−).

In the power supply device of the present invention described above, the voltage regulation unit 40 varies the level voltage $V_{level}$ according to the output current Iout of the power conversion module 10, such that the PWM circuit 1 of the power conversion module 10 is controlled to generate the drive signals $V_{G1}$ and $V_{G2}$ of different voltage levels. Hence, the conversion circuit 2 exhibits good conversion efficiency with different output currents Iout.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A voltage regulation module coupled to a power conversion module to form a closed loop, the power conversion module including a PWM circuit and a conversion circuit, the conversion circuit including a first power switch and a second power switch coupled in series, the PWM circuit outputting a drive signal to control the first power switch and the second power switch to turn on and off to cause the conversion circuit to generate an output current, said voltage regulation module comprising:

a subtraction circuit for obtaining a voltage that is related to the output current of the power conversion module, said subtraction circuit performing a subtraction operation on the voltage related to the output current and a reference voltage to generate a second regulation voltage;

a regulation circuit coupled to said subtraction circuit, said regulation circuit generating a level voltage according to the second regulation voltage, the level voltage being directly proportional to the output current, the PWM circuit adjusting a voltage level of the drive signal according to the level voltage, the voltage level of the drive signal following changes in the output current; and an amplifier circuit coupled between the power conversion module and said subtraction circuit, said amplifier circuit obtaining sampling voltages which are related to the output current of the power conversion module, and amplifying the sampling voltages by a predetermined ratio to generate a first regulation voltage, said subtraction circuit performing the subtraction operation on the first regulation voltage and the reference voltage to generate the second regulation voltage.

2. The voltage regulation module of claim 1, wherein said amplifier circuit includes a first operational amplifier, a first resistor, a second resistor, a third resistor having opposite terminals, and a fourth resistor having opposite terminals, said first resistor being coupled between an output terminal of said first operational amplifier and an inverting terminal of said first operational amplifier, said second resistor being coupled between a non-inverting terminal of said first operational amplifier and ground, one terminal of said third resistor and one terminal of said fourth resistor being coupled respectively to said inverting terminal and said non-inverting terminal of said first operational amplifier, the other terminal of said third resistor and the other terminal of said fourth resistor receiving the sampling voltages, said output terminal of said first operational amplifier outputting the first regulation voltage.

3. The voltage regulation module of claim 1, wherein said subtraction circuit includes a second operational amplifier, a fifth resistor, a sixth resistor, a seventh resistor having opposite terminals, and an eighth resistor having opposite terminals, said fifth resistor being coupled between an output terminal of said second operational amplifier and an inverting terminal of said second operational amplifier, said sixth resistor being coupled between a non-inverting terminal of said second operational amplifier and ground, one terminal of said seventh resistor and one terminal of said eighth resistor being coupled respectively to said inverting terminal and said non-inverting terminal of said second operational amplifier, the other terminal of said seventh resistor receiving the first regulation voltage, the other terminal of said eighth resistor receiving the reference voltage, said output terminal of said second operational amplifier outputting the second regulation voltage.

4. The voltage regulation module of claim 1, wherein said regulation circuit includes a third operational amplifier, a ninth resistor having opposite terminals, a tenth resistor, an eleventh resistor, and a transfer switch, one terminal of said ninth resistor being coupled to a non-inverting terminal of said third operational amplifier and the other terminal of said ninth resistor receiving the second regulation voltage, an inverting terminal of said third operational amplifier receiving the reference voltage, said transfer switch, said tenth resistor, and said eleventh resistor being coupled in series, a node between said tenth resistor and said eleventh resistor being coupled to said non-inverting terminal of said third operational amplifier, said transfer switch being controlled by an output voltage of said third operational amplifier, the level voltage being generated at a node between said transfer switch and said tenth resistor.

5. The voltage regulation module of claim 1, further comprising a sampling circuit coupled to said conversion circuit and said amplifier circuit, and used to perform sampling with respect to the output current of said power conversion module to generate the sampling voltages.

6. The voltage regulation module of claim 5, wherein said conversion circuit further includes a first inductor and a second inductor, said first inductor, said first power switch, and said second power switch being coupled in series, said second inductor being coupled to a node between said first power switch and said second power switch, said sampling circuit being connected in parallel to said second inductor, said sampling circuit including a first sampling resistor and a first sampling capacitor which is connected in series with said first sampling resistor, opposite terminals of said first sampling capacitor being coupled to said amplifier circuit, voltages at said opposite terminals of said first sampling capacitor being the sampling voltages.

7. The voltage regulation module of claim 5, wherein said conversion circuit further includes a first inductor and a second inductor, said first inductor, said first power switch, and said second power switch being coupled in series, said second inductor being coupled to a node between said first power switch and said second power switch, said sampling circuit being connected in parallel to said first inductor, said sampling circuit including a second sampling resistor and a second sampling capacitor which is coupled in series with said second sampling resistor, opposite terminals of said second sampling capacitor being coupled to said amplifier circuit, voltages at said opposite terminals of said second sampling capacitor being the sampling voltages.

8. The voltage regulation module of claim 5, wherein said sampling circuit is a third sampling resistor, said conversion circuit further including a first inductor and a second inductor having opposite terminals, said first inductor, said first power switch, and said second power switch being coupled in series, one terminal of said second inductor being coupled to a node between said first power switch and said second power switch, the other terminal of said second inductor being coupled to said third sampling resistor, opposite terminals of said third sampling resistor being coupled to said amplifier circuit, voltages at said opposite terminals of said third sampling resistor being the sampling voltages.

9. The voltage regulation module of claim 5, wherein said sampling circuit is a fourth sampling resistor, said conversion circuit further including a first inductor and a second inductor, said fourth sampling resistor, said first inductor, said first power switch, and said second power switch being coupled in series, said second inductor being coupled to a node between said first power switch and said second power switch, opposite terminals of said fourth sampling resistor being coupled to said amplifier circuit, voltages at said opposite terminals of said fourth sampling resistor being the sampling voltages.

10. A power supply device, comprising:
a power conversion module including a conversion circuit and a PWM circuit, said conversion circuit including a first power switch and a second power switch coupled in series, said PWM circuit being coupled to said conversion circuit and outputting a drive signal to control said first power switch and said second power switch to turn on and off to cause said conversion circuit to generate an output current; and
a voltage regulation module coupled to said power conversion module to form a closed loop, said voltage regulation module generating a level voltage according to the output current, the PWM circuit adjusting a voltage level of the drive signal according to the level voltage, the voltage level of the drive signal following changes in the output current,
wherein said voltage regulation module includes:
a subtraction circuit for obtaining a voltage that is related to the output current of said power conversion module, said subtraction circuit performing a subtraction operation on the voltage related to the output current and a reference voltage to generate a second regulation voltage; and
a regulation circuit coupled to said subtraction circuit, said regulation circuit generating the level voltage according to the second regulation voltage, the level voltage being directly proportional to the output current.

11. The power supply device of claim 10, wherein said voltage regulation module further includes an amplifier circuit coupled between said power conversion module and said subtraction circuit, said amplifier circuit obtaining sampling voltages which are related to the output current of said power conversion module, and amplifying the sampling voltages by a predetermined ratio to generate a first regulation voltage, said subtraction circuit performing the subtraction operation on the first regulation voltage and the reference voltage to generate the second regulation voltage.

* * * * *